United States Patent
Wakita et al.

[11] Patent Number: 6,045,684
[45] Date of Patent: Apr. 4, 2000

[54] PROCESS AND APPARATUS FOR THE PRODUCTION OF AN AQUEOUS SOLUTION OF HYDROGEN PEROXIDE

[75] Inventors: Shuhei Wakita; Masaharu Uno, both of Kanagawa; Takayuki Shimamune, Tokyo; Yoshinori Nishiki, Kanagawa; Kunio Nishimura, Osaka, all of Japan

[73] Assignees: Permelec Electrode Ltd., Kanagawa; Katayama Chemical, Inc., Osaka, both of Japan

[21] Appl. No.: 09/060,814

[22] Filed: Apr. 16, 1998

[30] Foreign Application Priority Data

Apr. 16, 1997 [JP] Japan .................................. 9-115294

[51] Int. Cl.$^7$ .................................................. B01D 61/44
[52] U.S. Cl. ...................... 205/466; 205/510; 204/522; 204/529; 204/531; 204/265; 204/277
[58] Field of Search .................................. 205/466, 510; 204/522, 529, 531, 277, 265

[56] References Cited

U.S. PATENT DOCUMENTS

| | | | |
|---|---|---|---|
| 3,341,441 | 9/1967 | Giuffrida et al. | 204/525 |
| 3,933,610 | 1/1976 | Ehara et al. | 204/529 |
| 4,921,587 | 5/1990 | Dong et al. | 205/466 |
| 4,995,956 | 2/1991 | Mani | 204/534 |
| 5,702,585 | 12/1997 | Hillrichs et al. | 205/466 |

*Primary Examiner*—Arun S. Phasge
*Attorney, Agent, or Firm*—Sughrue, Mion, Zinn, Macpeak & Seas, PLLC

[57] ABSTRACT

An on-site process and apparatus for producing hydrogen peroxide at a high efficiency substantially from brine and oxygen-containing gas alone as raw materials while removing alkaline earth metals. Sea water concentrated by an electrodialytic apparatus 2 or the like as a raw material is supplied to an impurity removing apparatus 10 where caustic soda produced in an acid-alkali producing apparatus 11 at a subsequent stage and/or carbon dioxide gas is added to remove alkaline earth metals contained in sea water in the form of a hydroxide or carbonate precipitate. Separately, the acid-alkali producing apparatus 11 performs a salt separating operation to produce caustic soda which is then supplied to a hydrogen peroxide generator 28 to produce an alkaline aqueous solution of hydrogen peroxide.

15 Claims, 3 Drawing Sheets

1

PROCESS AND APPARATUS FOR THE PRODUCTION OF AN AQUEOUS SOLUTION OF HYDROGEN PEROXIDE

FIELD OF THE INVENTION

The present invention relates to a process and apparatus for the electrochemical production of an aqueous solution of hydrogen peroxide from a relatively dilute brine, mainly sea water, without adding any components thereto other than an oxygen-containing gas (and optionally carbon dioxide gas).

BACKGROUND OF THE INVENTION

Hydrogen peroxide is useful as an indispensable reagent in the manufacture of foods, medicines, pulp, fiber, semiconductors, etc., and has been heretofore been synthesized by an anthraquinone method.

Heretofore, in a power plant or factory using sea water as cooling water, it has been the practice to directly electrolyze sea water to produce hypochlorous acid which is effectively used to prevent the attachment of organisms onto the inner wall of a condenser. However, because hypochlorous acid itself and organic chlorine compounds or chlorine gas produced by the decomposition thereof are harmful to the environment, hypochlorous acid should not be discharged as such. The regulation of hypochlorous acid discharge has intensified.

On the other hand, it has been reported that hydrogen peroxide, if added to the foregoing cooling water, prevents the attachment of organisms. It has also been reported that the addition of hydrogen peroxide advantageously maintains the quality of water in a fish farm. Furthermore, hydrogen peroxide decomposes to only water and oxygen, which are harmless and cause no problems in environmental health.

However, hydrogen peroxide is unstable and thus cannot be stored over an extended period of time. For this reason, and from the standpoint of safety and environmental protection during transportation, the demand for an on-site type apparatus for the production of hydrogen peroxide has grown.

In order to meet this demand, the study of synthesis methods for the production of hydrogen peroxide by reduction with oxygen gas has heretofore been reported. U.S. Pat. No. 3,693,749 proposes several kinds of electrolytic apparatus. U.S. Pat. No. 4,384,931 discloses an electrolytic process using an ion-exchange membrane as a process for the production of an alkaline aqueous solution of hydrogen peroxide. Furthermore, U.S. Pat. No. 3,969,201 discloses a hydrogen peroxide production apparatus comprising a carbon negative electrode and an ion-exchange membrane which are three-dimensional. However, this proposal is disadvantageous in that the resulting aqueous solution of hydrogen peroxide has a high alkali concentration as compared with the hydrogen peroxide concentration and thus is restricted in terms of its use. Moreover, U.S. Pat. Nos. 4,406,758, 4,891,207 and 4,457,953 disclose a process for the production of hydrogen peroxide using a porous membrane material and a porous hydrophobic carbon negative electrode. These processes are disadvantageous in that the amount and rate of migration of electrolytic solution from the positive electrode chamber to the negative electrode chamber is difficult to control, thus complicating the operation. Furthermore, in the Journal of The Electrochemical Society, Vol. 130, pp. 1,117—(1983), a process is proposed which comprises supplying sulfuric acid to a middle chamber between a cation-exchange membrane and an anion-exchange membrane to stably obtain an acidic solution of hydrogen peroxide. Moreover, it is reported in "Denki Kagaku (Electrochemistry)", Vol. 57, page 1073, 1989, that the use of a membrane electrode connection as an anode makes it possible to improve the properties of the system. However, this process is economically disadvantageous in that the power supply is expensive. All of these processes involve the efficient production of hydrogen peroxide in an atmosphere of an alkaline aqueous solution. Therefore, these processes require the use of an alkaline component as a raw material. This alkaline component is difficult to transport. Thus, a satisfactory hydrogen peroxide production apparatus has heretofore not been provided.

On the other hand, as discussed above, from the standpoint of problems arising from the direct electrolysis of sea water, the use of hydrogen peroxide in the treatment of sea water has been extensively studied as an economically favorable approach. The conventional process for the production of hydrogen peroxide by electrolysis of sea water is further disadvantageous in that it involves the addition of chemicals to sea water, thereby causing another environmental pollution problem. In the case where hydrogen peroxide is also used to treat sea water, and if an alkaline aqueous solution is separately prepared and added to the sea water, similar environmental pollution occurs.

In order to eliminate these difficulties, the inventors proposed a process for the production of hydrogen peroxide which comprises subjecting sea water to salt separation to obtain an alkaline aqueous solution and an acidic aqueous solution, and then producing hydrogen peroxide from the alkaline aqueous solution, characterized in that the alkaline aqueous solution thus used is neutralized with the acidic aqueous solution. This process eliminates the need for externally adding chemicals and thus causes little or no environmental pollution. This process also requires an extremely small amount of power, and thus is an ideal production process. However, this production process is disadvantageous in that while the electrolysis actually continues, it is difficult to remove an alkaline earth metal such as calcium and magnesium contained in sea water under stable conditions. This process is also disadvantageous in that the alkali concentration of the alkaline aqueous solution for the production of hydrogen peroxide cannot be adequately increased.

SUMMARY OF THE INVENTION

It is therefore an object of the present invention to provide a process and apparatus for the on-site production of high purity hydrogen peroxide at high efficiency from sea water as a raw material without the need for adding thereto components other than an oxygen-containing gas (and optionally carbon dioxide gas) to the sea water.

The foregoing objects of the present invention will become more apparent from the following detailed description and examples.

The present invention concerns a process for producing an aqueous solution of hydrogen peroxide from brine containing an alkaline earth metal ion, which comprises removing alkaline earth metal ion from the brine, separating the brine into an alkaline aqueous solution and an acidic aqueous solution, and electrolyzing the alkaline aqueous solution while adding thereto an oxygen-containing gas to produce an aqueous solution of hydrogen peroxide, wherein said removing step comprises adding a part of the alkaline aqueous solution produced in the separating step to the brine prior to electrolysis.

In accordance with the production process of the present invention, a high purity aqueous solution of hydrogen peroxide free of alkaline earth metal ion can be produced. In this process, the addition of an alkaline aqueous solution may be accompanied by blowing carbon dioxide gas through the brine that causes the alkaline earth metal ion to precipitate in the form of a carbonate, thereby facilitating the removal of the alkaline earth metal ion. Furthermore, the addition of an alkaline aqueous solution may be replaced or augmented by electrodialysis to remove the alkaline earth metal ion.

The present invention also concerns an apparatus for producing an aqueous solution of hydrogen peroxide from sea water containing alkaline earth metal ion, which comprises means for removing alkaline earth metal ion from sea water, means for separating the sea water into an alkaline aqueous solution and an acidic aqueous solution, and means for electrolyzing the alkaline aqueous solution while adding thereto an oxygen-containing gas to produce an aqueous solution of hydrogen peroxide, wherein said removing means further comprises recycling means for adding a part of the alkaline aqueous solution produced by said separating means to the brine prior to electrolysis.

BRIEF DESCRIPTION OF THE DRAWINGS

By way of example and to make the description more clear, reference is made to the accompanying drawings in which.

DETAILED DESCRIPTION OF THE INVENTION

The present invention will be described in further detail below.

The present invention contemplates a production process which comprises the production of a high purity aqueous solution of hydrogen peroxide from a dilute brine containing an alkaline earth metal ion, particularly sea water, as a raw material, without adding any external chemicals thereto other than an oxygen-containing gas (and optionally waste gas containing carbon dioxide gas). In this manner the required chemicals can be prepared from the dilute brine as a raw material, thereby preventing environmental pollution by not adding chemicals to the dilute brine while enabling efficient removal of alkaline earth metal ion to produce the desired high purity aqueous solution of hydrogen peroxide.

The order of steps in the production process of the present invention will be described hereinafter in connection with the flow chart shown in FIG. 1.

In the present invention, solids are preferably previously removed by a strainer 1 or the like. Subsequently, if the brine as a raw material is a dilute brine, it is concentrated to have an increased sodium chloride concentration so that an aqueous solution of caustic soda having a high concentration can be efficiently produced. If a concentrated brine is readily available, it is not necessary to concentrate the brine. The means of concentrating the dilute brine is not particularly limited but is preferably accomplished by an electrodialytic method. The electrodialysis enables the concentration of the dilute brine as well as the partial removal of the alkaline earth metals as an impurity to further advantage.

Figure 1:
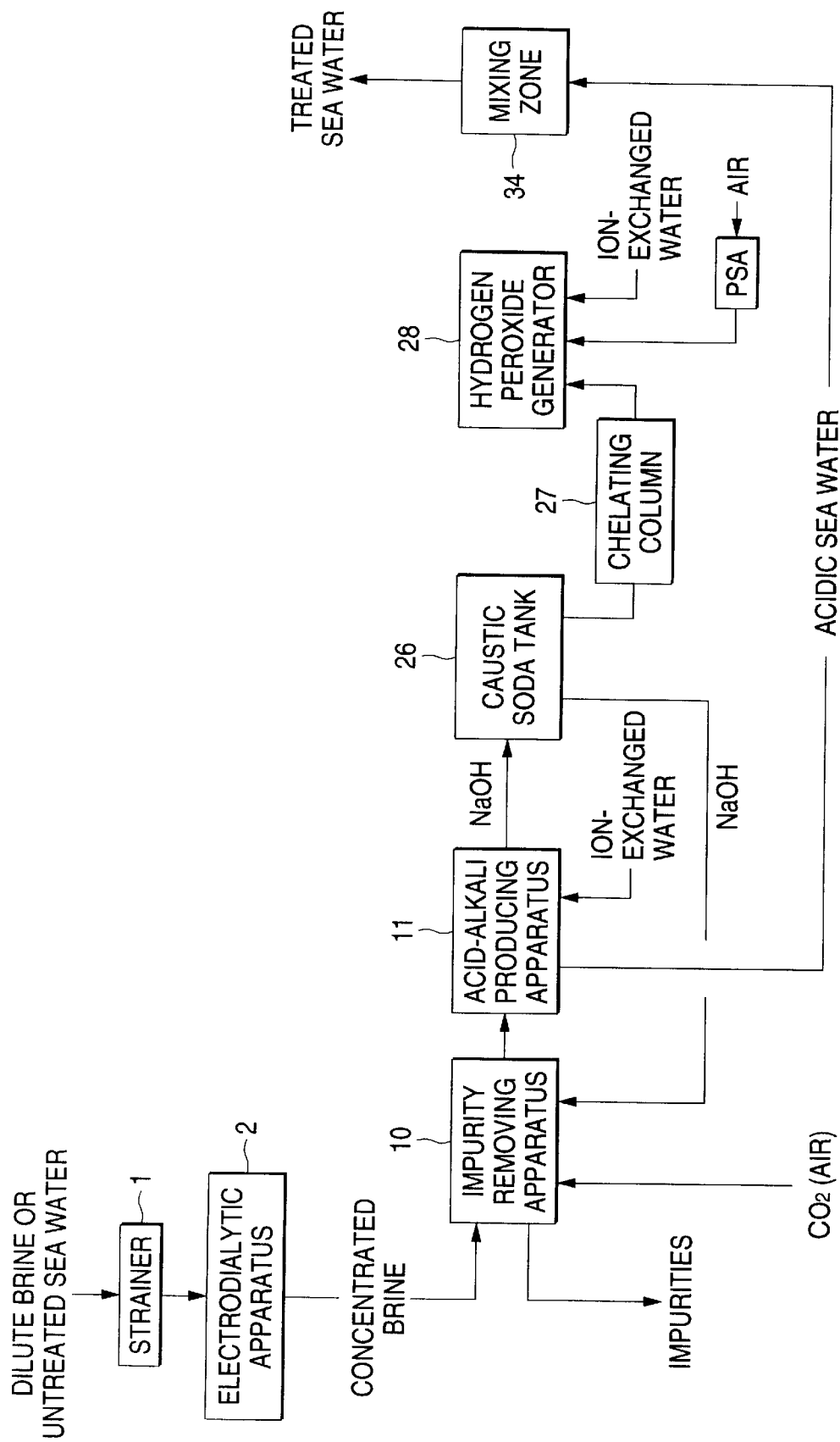
FIG. 1 is a flow chart illustrating the order of steps in the production process according to the present invention.
Figure 2:
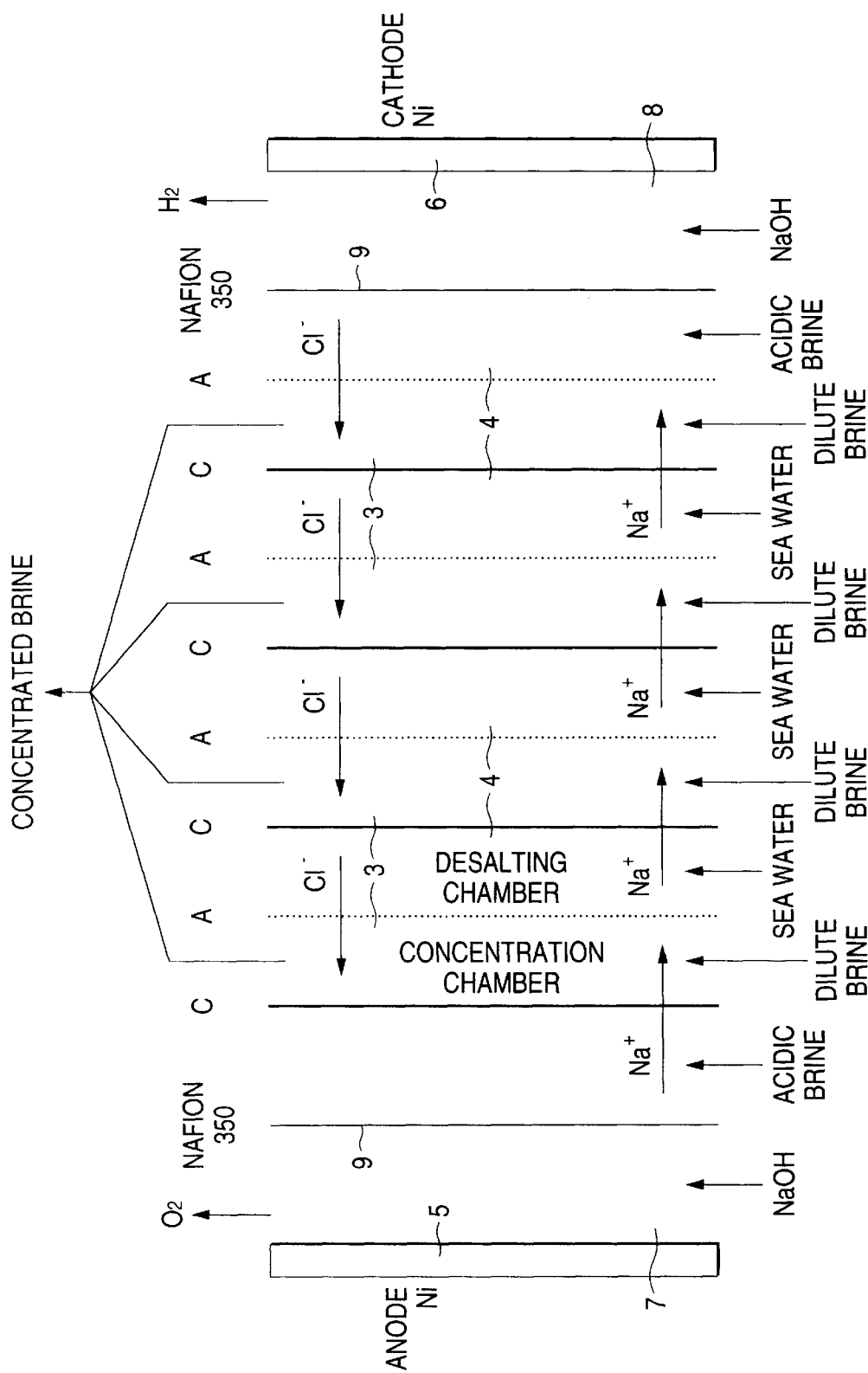
FIG. 2 is a schematic diagram illustrating an example of an electrodialytic apparatus shown in the flow chart of FIG. 1.

The electrodialytic apparatus 2 shown in FIG. 1 has a structure as shown in FIG. 2. An anode 5 and a cathode 6 are provided at the opposing sides of an electrodialytic apparatus comprising a concentration chamber 3 and a desalting chamber 4 partitioned from each other by a plurality of alternating cation-exchange membranes A and anion-exchange membranes C. Examples of commercially available membranes for use in the invention include the cation-exchange membrane CMX and the anion-exchange membrane AMH available from Tokuyama Co., Ltd., and Selemion CMV and AMV, available from Asahi Glass Co., Ltd. A spacer (not shown) is interposed between the membranes to prevent these membranes from coming in contact with each other. The anode chamber 7 and cathode chamber 8 provided at opposing sides of the electrodialytic apparatus 2 are supplied with an appropriate electrolytic solution such as aqueous solution of caustic soda which is produced at a subsequent stage as needed. A membrane 9 which borders the anode chamber 7 and the cathode chamber 8 is preferably a corrosion-resistant fluororesin membrane such as Nafion (available from Du Pont, Inc.) to inhibit deterioration by oxidizing or reducing substances which have been supplied or produced by the electrolysis. The foregoing anode and cathode are preferably both made of stainless steel. The anode is preferably an insoluble metal electrode comprising a titanium substrate coated with iridium oxide or the like, e.g., a so-called DSE, because it consumes less power and thus is stable and requires a lower voltage. However, DSE electrodes are expensive, and thus may be selected depending on the particular operating conditions.

An electric current is applied to the electrodialytic apparatus 2 across the electrodes while a dilute brine which has been separately prepared and a brine containing an alkaline earth metal as a raw material such as sea water are supplied to the concentration chamber 3 and the desalting chamber 4, respectively. The anode chamber and cathode chamber in the electrodialytic apparatus undergo the following reactions, respectively.

Anode Reaction $$H_2 \rightarrow 2H^+ + 2e^-$$

or $$2Cl^- \rightarrow Cl_2 + 2e^-$$

and $$2H_2O \rightarrow O_2 + 4H^+ + 4e^-$$

Cathode Reaction $$2H_2O + 2e^- \rightarrow H_2 + 2OH^-$$

or $$O_2 + 2H_2O + 4e^- \rightarrow 4OH^-$$

The dialytic reaction by the combination of an anion-exchange membrane and a cation-exchange membrane as a main function of the electrodialytic apparatus is indicated by the arrow in FIG. 2. In other words, the reaction is as follows:

Na$^+$ (desalting chamber)→Na$^+$ (concentration chamber)

Cl$^-$ (desalting chamber)→Cl$^-$ (concentration chamber)

Accordingly, the sodium chloride concentration of the dilute brine which has been supplied to the concentration chamber 4 is increased to produce a concentrated brine. Preferably, the sodium chloride concentration in the concentration chamber is increased as much as possible. However, as the sodium chloride concentration in the concentration chamber increases, namely, as the sodium chloride concentration in the desalting chamber decreases, the current efficiency is reduced. Therefore, the sodium chloride concentration in the concentration chamber is normally increased two to four times, e.g., to about 60 to 100 g/l. The current density is preferably from 0.5 to 5 A/dm$^2$.

The use of a membrane having selective permeability to monovalent ions as the cation-exchange membrane prevents the alkaline earth metal in the brine supplied as a raw material to the desalting chamber 4 from migrating to the concentration chamber. This decreases the content of alkaline earth metal in the concentrated brine of the concentration chamber, thus accomplishing the removal of impurities at a first stage.

Permeability of di- or trivalent cations for the cationic exchange membrane can be decreased by giving an anion-exchange film, for example by laminating a thin layer of an anion-exchange resin or by chemically changing the surface of the membrane to produce an anion-exchange layer. This is a conventional method using the repulsion between cation species, which increases their valence.

Subsequently, the concentrated or unconcentrated brine containing an alkaline earth metal is introduced into an impurity removing apparatus in which impurities are then removed. The impurity removing apparatus 10 uses an aqueous solution of caustic soda produced at a subsequent stage to remove the alkaline earth metal from the brine in the form of a hydroxide precipitate. The addition of an aqueous solution of caustic soda may be accompanied by blowing carbon dioxide gas that results in precipitation of the alkaline earth metal in the form of a carbonate such as calcium carbonate and magnesium carbonate, providing further enhancement of removal efficiency. Carbon dioxide gas is preferably supplied in the form of air-containing carbon dioxide gas. For example, the use of combustion waste gas from a thermoelectric power plant, etc., which has a high carbon dioxide gas content, is desirable. When treated by the impurity removing apparatus, some water is removed by the brine to increase the sodium chloride concentration thereof. The brine containing the precipitate thus produced is then passed through a filtering apparatus such as a sand filter to remove the precipitate. Preferably, the precipitate thus removed is then redissolved in an acidic brine produced at a subsequent salt separation step, and the brine is eventually neutralized and returned to the sea. The foregoing alkaline earth metal such as calcium and magnesium may be removed by a reverse osmosis filtering apparatus.

Figure 3:
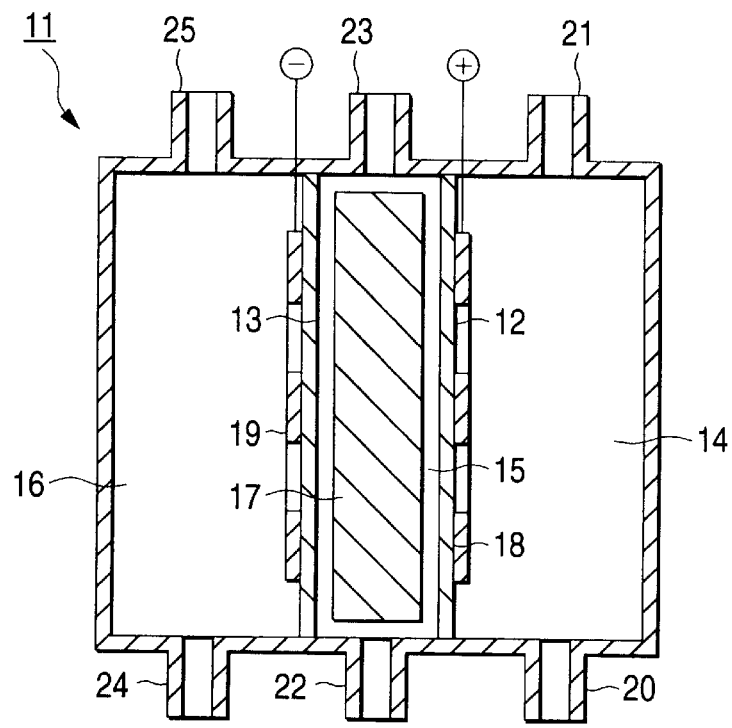
FIG. 3 is a schematic diagram illustrating an example of an acid-alkali producing apparatus shown in the flow chart of FIG. 1.

The brine having an increased concentration and having been freed of alkaline earth metal is then supplied to the middle chamber of an acid-alkali producing apparatus (salt separating apparatus) 11 which is partitioned into three chambers by first and second cation-exchange membranes. The acid-alkali producing apparatus 11 has a structure as shown in FIG. 3. The apparatus (main body of electrolytic cell) 11 is partitioned into an anode chamber 14, a middle chamber 15 and a cathode chamber 16 by a first cation-exchange membrane 12 and a second cation-exchange membrane 13. The space of the middle chamber 15 is mostly occupied by a spacer 17 for preventing the two cation-exchange membranes from coming in contact with each other. A porous anode 18 is provided in contact with the first cation-exchange membrane 12 on the anode chamber side thereof while a porous cathode 19 is provided in contact with the second cation-exchange membrane 13 on the cathode chamber side thereof.

An anolyte inlet 20 and an anolyte outlet 21 are provided on the bottom plate and the upper plate of the anode chamber 14, respectively. A middle chamber solution inlet 22 and a middle chamber solution outlet 23 are provided on the bottom plate and the upper plate of the middle chamber 15, respectively. A catholyte inlet 24 and a catholyte outlet 25 are provided on the bottom plate and the upper plate of the cathode chamber 16, respectively.

The anode 18 may be a gas diffusion electrode in which case hydrogen gas is supplied thereto. The hydrogen gas supplied to the gas diffusion electrode may be a gas produced by the cathode in the salt separation apparatus or a gas produced at the terminal cathode chamber in the foregoing electrodialytic apparatus. If a gas diffusion electrode is used as the cathode, an electrode designed for use as a gas diffusion electrode is preferably used. Examples of such a gas diffusion electrode include a platinum catalyst supported on a network substrate of carbon fiber, and platinum and other platinum group elements or oxides thereof supported on a fine mesh. An electrode known as an insoluble electrode cannot serve as a gas diffusion electrode even if hydrogen gas is supplied thereto. Thus, such an insoluble electrode cannot exert a sufficient voltage lowering effect as compared with an ordinary gas diffusion electrode, but can inhibit the production of chlorine. In this case, the anode chamber may comprise a gas chamber alone with the anode provided in contact with the ion-exchange membrane. Alternatively, hydrogen gas may be blown through sea water which has been passed through the anode chamber as an anolyte.

The cathode for use in the apparatus of FIG. 3 may be a mesh made of stainless steel or nickel similar to the cathode in the foregoing electrodialytic apparatus 2. The catholyte may be sea water or tap water supplied with a dilute aqueous solution of caustic soda which has been electrolyzed and then diluted by the foregoing electrodialytic apparatus. Alternatively, the catholyte may be an aqueous solution of caustic soda obtained by the reaction of a so-called permeating water which has migrated through the ion-exchange membrane from the anode chamber side, sodium ion and hydroxy group produced by decomposition of water with the cathode provided in contact with the ion-exchange membrane. Because the necessary concentration of caustic soda is normally from 5 to 10%, some amount of tap water is preferably supplied to the cathode chamber. The ion-exchange membrane for use herein is not particularly limited. From the standpoint of stability and fastness, a fluororesin-based perfluorocarbon sulfonic acid type cation-exchange membrane such as Nafion 117 and 350 may be used, available from Du Pont, Inc. of U.S.A. However, these ion-exchange membranes are expensive. Furthermore, because the electrolytic solution is not oxidizing, a hydrocarbon-based ion-exchange membrane such as Selemion, available from Asahi Glass Co., Ltd., and Neocepta, available from Tokuyama Co., Ltd. may be used.

When current is applied to the foregoing electrolytic cell across the electrodes while concentrated brine obtained from the electrodialytic apparatus is supplied to the middle chamber, oxygen is produced in the anode chamber, sodium ion migrates from the middle chamber to the cathode chamber and water is electrolyzed in the cathode chamber to produce hydroxyl ion. The two ions then bond to each other to produce caustic soda at a current efficiency of not less than 70%. The voltage applied during this procedure depends on the thickness of the middle chamber but is normally from 5 to 15 V.

If sea water or concentrated sea water is supplied to the anode chamber, chlorine may be produced at the anode. It is then necessary to separately dispose the chlorine thus produced as described above. For example, the anolyte containing chlorine thus produced may be reacted with hydrogen peroxide produced at a subsequent stage.

The aqueous solution of caustic soda produced in the cathode chamber 16 in the acid-alkali producing apparatus 11 is then reserved in a caustic soda tank 26 shown in FIG. 1. Some amount of the aqueous solution of caustic soda is recycled to the impurity removing apparatus 10 as indicated by the arrow in FIG. 1. The remaining majority of the aqueous solution of caustic soda is then preferably passed through a chelating column 27 to further remove calcium or magnesium. The aqueous solution of caustic soda is then supplied to a hydrogen peroxide generator (hydrogen peroxide producing electrolytic cell) 28.

Figure 4:
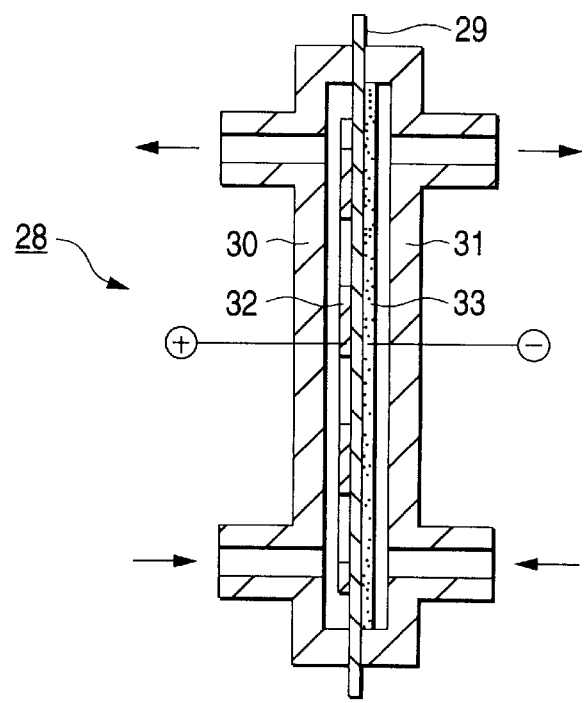
FIG. 4 is a schematic diagram illustrating an example of an electrolytic cell for the production of hydrogen peroxide shown in the flow chart of FIG. 1; wherein the reference numeral 1 indicates a strainer, the reference numeral 2 indicates an electrodialytic apparatus, the symbol A indicates a cation-exchange membrane, the symbol C indicates an anion-exchange membrane, the reference numeral 3 indicates a concentration chamber, the reference numeral 4 indicates a desalting chamber, the reference numeral 5 indicates an anode, the reference numeral 6 indicates a cathode, the reference numeral 7 indicates an anode chamber, the reference numeral 8 indicates a cathode chamber, the reference numeral 9 indicates a membrane, the reference numeral 10 indicates an impurity removing apparatus, the reference numeral 11 indicates an acid-alkali producing apparatus (salt separation apparatus), the reference numeral 12 indicates a first ion-exchange membrane, the reference numeral 13 indicates a second ion-exchange membrane, the reference numeral 14 indicates an anode chamber, the reference numeral 15 indicates a middle chamber, the reference numeral 16 indicates a cathode chamber, the reference numeral 17 indicates a spacer, the reference numeral 18 indicates an anode, the reference numeral 19 indicates a cathode, the reference numeral 26 indicates a caustic soda tank, the reference numeral 27 indicates a chelating column, the reference numeral 28 indicates a hydrogen peroxide generator (electrolytic cell for the production of hydrogen peroxide), the reference numeral 29 indicates an ion-exchange membrane, the reference numeral 30 indicates an anode chamber, the reference numeral 31 indicates a cathode chamber, the reference numeral 32 indicates an anode, the reference numeral 33 indicates a cathode, and the reference numeral 34 indicates a mixing zone.

The structure of the hydrogen peroxide producing electrolytic cell 28 is not particularly limited. However, as shown in FIG. 4, a typical example of the structure of the hydrogen peroxide producing electrolytic cell 28 comprises an anode chamber frame 30 having a frame-shaped indentation formed on a side thereof and a cathode chamber frame 31 having a frame-shaped indentation formed on an opposite side thereof with a sheet-like fluororesin-based ion-exchange membrane 29 interposed therebetween.

A porous dimensionally-stabilized anode 32 is provided in the indentation of the anode chamber frame 30 in contact with the ion-exchange membrane 29. On the other hand, provided in the indentation of the cathode chamber frame 31 in contact with the ion-exchange membrane 29 is a semi-hydrophobic gas diffusion electrode 33 preferably having carbon or gold supported thereon which accelerates the production of hydrogen peroxide.

The reduction reaction of oxygen in the cathode chamber in the electrolytic cell 28 allows the production of hydrogen peroxide. Oxygen gas is preferably supplied to the cathode chamber as a raw material for producing hydrogen peroxide. The oxygen gas is preferably recycled oxygen gas produced at the anode in the hydrogen peroxide producing electrolytic cell 28. Because the amount of oxygen gas produced at the anode accounts for only 50% of the required amount, oxygen gas produced in the anode chamber of the acid-alkali producing apparatus may be supplied to the cathode chamber. Air, which is an oxygen-containing gas, may be supplied instead of oxygen gas. However, if air is supplied, nitrogen contained therein may impede the reaction. Therefore, air should be supplied in an mount of not less than twice the stoichiometric amount. Accordingly, the required amount of gas (air) is about 10 times the stoichiometric amount of oxygen. Air, if supplied, may be concentrated by a PSA (Pressure Swing Adsorption) method to produce air containing highly concentrated oxygen which is then supplied to the cathode chamber.

The aqueous solution of caustic soda containing hydrogen peroxide produced in the electrolytic cell 28 may be used for other bactericidal purposes. However, in many cases, it is passed to a mixing zone following the electrolytic cell 28 where it is mixed with the acidic sea water produced at the acid-alkali producing apparatus 11, and then returned to the sea water line where it is used to sterilize sea water. As described above, the apparatus of the present invention allows for the production of hydrogen peroxide from an oxygen-containing gas (and optionally carbon dioxide gas) alone besides sea water as raw materials and thus is an excellent on-site production apparatus. Furthermore, the caustic soda thus produced can be neutralized by acidic sea water that is separately produced by the process. Moreover, the aqueous solution of caustic soda thus produced has a concentration of several percent. If the aqueous solution of caustic soda is diluted by sea water to a required concentration and then returned to sea water, no environmental pollution occurs. Even if the acidic sea water and caustic soda thus produced are returned to sea at separate positions, there is no adverse effect on pH as a whole. Rather, the effect of inhibiting the growth of harmful organisms by the bactericidal effect of the acidic sea water and caustic soda is expected.

The present invention will be further described in the following Examples of the process for producing hydrogen peroxide, but the present invention should not be construed as being limited thereto.

EXAMPLE 1

An apparatus shown in FIG. 1 the was prepared. Sea water was used as a test water.

Sea water (test water) having an alkaline earth metal concentration of 1,700 ppm was passed through a strainer to remove a large solid content and was then passed to an electrodialytic apparatus where it was concentrated. The dialytic cell comprised four pairs of a cation-exchange membrane having selective permeability to monovalent ions available from Tokuyama Co., Ltd. and an anion-exchange membrane. The terminal anode chamber and the terminal cathode chamber were each bordered by a cation-exchange membrane Nafion 117 available from Du Pont, Inc. As an anode, an insoluble metal electrode was used comprising a titanium mesh coated with a composite oxide made of iridium oxide and tantalum oxide. As a cathode, a mesh made of stainless steel SUS304 was used. These electrodes were each disposed in contact with the ion-exchange membrane. The electrolyzing area was 2 $dm^2$, and the current density was 1 $A/dm^2$. The liquid feed rate was 10 ml/min. each for sea water (test water) and concentrated water. In this process, the test water was concentrated from 30 g/l to 80 g/l. The concentration chamber of the electrodialytic apparatus provided a concentrated test water having a sodium chloride concentration of 80 g/l. The concentrated test water had an alkaline earth metal concentration of 1,000 ppm.

The concentrated test water was then recycled to an impurity removing apparatus 10. To the impurity removing apparatus 10 was also recycled an aqueous solution of caustic soda from a caustic soda tank 26 described below so that the pH value of the solution in the apparatus 10 was from 12 to 13. Air containing carbon dioxide gas was blown through the solution. A white precipitate thus produced was then removed at a subsequent sand filter (not shown). The sand filter was regularly back-washed with part of an acid water produced at a subsequent stage and sea water. The test water which had been passed through the sand filter had an alkaline earth metal concentration of about 5 ppm.

The concentrated test water from which most of the alkaline earth metal had been removed was then introduced into the middle chamber of an acid-alkali producing apparatus (salt separating apparatus). The acid-alkali producing apparatus comprised a cation-exchange membrane Nafion 117 available from Du Pont, Inc. as a membrane. As an anode, a hydrogen gas diffusion electrode was used comprising platinum supported on a carbon cloth. This arrangement prevented the production of chlorine. The surface of the anode was covered with a Nafion 117 cation-exchange membrane so that it did not come into direct contact with the electrolytic solution. As a cathode, a nickel fine mesh was used. The cathode was positioned 2 mm apart from a Nafion 350 membrane. A middle chamber was formed by a resin net. The membranes were fixed at a distance of 5 mm.

As hydrogen gas, waste gas from the cathode side of the acid-alkali producing apparatus and the cathode side of the electrodialytic apparatus was used. The hydrogen gas was supplied under no pressure. The electrolyzing area was 2 $dm^2$, and the current density was 20 $A/dm^2$. Pure water was supplied to the anode chamber at a rate of 20 ml/min., sea water (test water) as a raw material was supplied to the middle chamber at a rate of 50 ml/min., and water was supplied to the cathode chamber at a rate of 15 ml/min. In this process, an aqueous solution of caustic soda having a concentration of from 7 to 8% was produced from the cathode side of the acid-alkali producing apparatus 11, while acidic sea water (test water) having a chloric acid concentration of 1% was produced from the middle chamber of the acid-alkali producing apparatus 11.

The aqueous solution of caustic soda thus obtained was then supplied to an electrolytic cell for the production of hydrogen peroxide. The electrolytic cell for the production of hydrogen peroxide comprised as a membrane the same Nafion 117 cation-exchange membrane as described above. A network material made of nickel wire was provided in contact with the membrane. As a cathode, a porous carbon plate backed with a porous PTFE resin (Teflon) sheet was used. The cathode was positioned 10 mm apart from the cation-exchange membrane on the porous carbon side thereof. The aqueous solution of caustic soda was supplied to the cathode chamber and anode chamber in a sufficient amount. Oxygen gas was supplied to the cathode on the PTFE sheet side thereof. Electrolysis was effected at an electrolyzing area of 1.25 $dm^2$ and a current density of 4 $A/dm^2$. As a result, an alkaline aqueous solution of hydrogen peroxide having a concentration of about 1% was produced at a rate of 10 ml/min. The current efficiency was about 90%.

As described above, the present invention concerns a process for producing an aqueous solution of hydrogen peroxide which comprises subjecting brine containing an alkaline earth metal ion to salt separation to produce an alkaline aqueous solution and an acidic aqueous solution, and then electrolyzing the alkaline aqueous solution while introducing therein an oxygen-containing gas to produce an aqueous solution of hydrogen peroxide. The inventive process further comprises adding a part of the alkaline aqueous solution to the brine containing an alkaline earth metal ion to remove the alkaline earth metal in the form of a hydroxide precipitate prior to electrolysis, or a part of the alkaline aqueous solution is added to the brine containing an alkaline earth metal ion to remove the alkaline earth metal in the form of a hydroxide precipitate while adding thereto a carbon dioxide-containing gas to remove part of the alkaline earth metal ion in the form of a carbonate prior to electrolysis, or the brine containing an alkaline earth metal ion is subjected to electrodialysis using a membrane having selective permeability to monovalent ions to remove alkaline earth metal ion before electrolysis. In accordance with the process of the present invention, a high purity aqueous solution of hydrogen peroxide is produced.

The previous proposal of the inventors which comprises subjecting sea water to salt separation to obtain an alkaline aqueous solution and an acidic aqueous solution, producing hydrogen peroxide from the alkaline aqueous solution, and then neutralizing the alkaline aqueous solution thus left with the acidic aqueous solution to produce hydrogen peroxide is an ideal production process requiring no external addition of chemicals and only low electric power consumption. However, this production process is disadvantageous in that it is difficult to stably remove alkaline earth metal from the sea water.

The present invention eliminates this disadvantage and thus provides an on-site process for the efficient production of hydrogen peroxide. In accordance with the production process of the present invention, alkaline earth metals are easily removed using a compound produced therein, a readily available gas or a membrane having selective permeability to monovalent ions, thereby facilitating the production of hydrogen peroxide.

The present invention also concerns an apparatus for producing an aqueous solution of hydrogen peroxide by subjecting sea water to salt separation to produce an alkaline aqueous solution and an acidic aqueous solution, and then subjecting the alkaline aqueous solution to electrolysis while adding thereto an oxygen-containing gas. The apparatus comprises a means for concentrating sea water, and a means for recycling the alkaline aqueous solution through the sea water to precipitate the alkaline earth metal ion in the sea water in the form of a hydroxide. The apparatus of the present invention employs a process which comprises the use of an alkaline aqueous solution produced therein, making it possible to remove alkaline earth metals without using a separate device. Thus, the adverse effects of alkaline earth metals on the production of hydrogen peroxide can be eliminated.

While the invention has been described in detail and with reference to specific embodiments thereof, it will be apparent to one skilled in the art that various changes and modifications can be made therein without departing from the spirit and scope thereof.

What is claimed is:

1. A process for producing an aqueous solution of hydrogen peroxide from sea water containing an alkaline earth metal ion, which comprises removing alkaline earth metal ion from the sea water, separating the sea water into an alkaline aqueous solution and an acidic aqueous solution, and then electrolyzing the alkaline aqueous solution while adding thereto an oxygen-containing gas to produce an aqueous solution of hydrogen peroxide, wherein said removing step comprises adding a part of the alkaline aqueous solution produced in the separating step to the brine prior to electrolysis.

2. The process of claim 1, further comprising the step of concentrating the sea water prior to said separating step.

3. The process of claim 2, wherein said concentrating step comprises subjecting the sea water to electrodialysis.

4. The process of claim 1, wherein said separating step comprises subjecting the sea water to salt separation.

5. The process of claim 1, wherein said removing step comprises removing alkaline earth metal ion from the sea water in the form of a hydroxide precipitate.

6. A process for producing an aqueous solution of hydrogen peroxide from sea water containing an alkaline earth metal ion, which comprises removing alkaline earth metal ion from the sea water, separating the sea water into an alkaline aqueous solution and an acidic aqueous solution, and then electrolyzing the alkaline aqueous solution while adding thereto an oxygen-containing gas to produce an aqueous solution of hydrogen peroxide, wherein said removing step comprises adding a part of the alkaline aqueous solution produced in the separating step to the sea water prior to electrolysis to remove part of the alkaline earth metal ion in the form of a hydroxide precipitate and adding a carbon dioxide-containing gas to the sea water prior to electrolysis to remove part of the alkaline earth metal ion in the form of a carbonate precipitate.

7. The process of claim 6, further comprising the step of concentrating the sea water prior to said separating step.

8. The process of claim 7, wherein said concentrating step comprises subjecting the sea water to electrodialysis.

9. A process for producing an aqueous solution of hydrogen peroxide from sea water containing an alkaline earth metal ion, which comprises removing alkaline earth metal ion from the sea water, separating the sea water into an alkaline aqueous solution and an acidic aqueous solution, and then electrolyzing the alkaline aqueous solution while adding thereto an oxygen-containing gas to produce an aqueous solution of hydrogen peroxide, wherein said removing step comprises subjecting the sea water containing an alkaline earth metal ion to electrodialysis prior to electrolysis using a membrane having selective permeability to monovalent ions.

10. The process of claim 9, wherein said separating step comprises subjecting the sea water to salt separation.

11. An apparatus for producing an aqueous solution of hydrogen peroxide from sea water containing alkaline earth metal ion, which comprises means for removing alkaline earth metal ion from the sea water, means for separating the sea water into an alkaline aqueous solution and an acidic aqueous solution, and means for electrolyzing the alkaline aqueous solution while adding thereto an oxygen-containing gas to produce an aqueous solution of hydrogen peroxide, wherein said removing means comprises one or more of (i) recycling means for adding a part of the alkaline aqueous solution produced by said separating means to the sea water prior to electrolysis; (ii) means for adding a carbon dioxide-containing gas to the sea water prior to electrolysis; and (iii) electrodialytic means comprising a membrane having selective permeability to monovalent ions.

12. The apparatus of claim 11, comprising means for concentrating the sea water prior to electrolysis.

13. The apparatus of claim 12, wherein said concentrating means comprises electrodialytic means.

14. The apparatus of claim 11, wherein said removing means comprises recycling means for adding a part of the alkaline aqueous solution produced by said separating means to the sea water prior to electrolysis.

15. The apparatus of claim 11, wherein said removing means comprises recycling means for adding a part of the alkaline aqueous solution produced by said separating means to the sea water prior to electrolysis and means for adding a carbon dioxide-containing gas to the sea water prior to electrolysis.

* * * * *